(12) United States Patent
Fukai et al.

(10) Patent No.: US 9,776,555 B2
(45) Date of Patent: Oct. 3, 2017

(54) VEHICULAR LAMP WITH OLED HAVING REPEATED REFLECTIONS

(71) Applicant: KOITO MANUFACTURING CO., LTD., Tokyo (JP)

(72) Inventors: Kunio Fukai, Shizuoka (JP); Yukihiro Onoda, Shizuoka (JP); Masaya Shido, Shizuoka (JP); Haruhiko Iyoda, Shizuoka (JP); Asami Nakada, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 46 days.

(21) Appl. No.: 14/471,580

(22) Filed: Aug. 28, 2014

(65) Prior Publication Data

US 2015/0062946 A1 Mar. 5, 2015

(30) Foreign Application Priority Data

Sep. 2, 2013 (JP) ................................. 2013-181233
May 13, 2014 (JP) ................................. 2014-099824

(51) Int. Cl.
*B60Q 1/26* (2006.01)
*F21S 8/10* (2006.01)
*F21Y 105/00* (2016.01)
*F21Y 115/15* (2016.01)

(52) U.S. Cl.
CPC .............. *B60Q 1/26* (2013.01); *F21S 48/217* (2013.01); *F21S 48/24* (2013.01); *F21Y 2105/00* (2013.01); *F21Y 2115/15* (2016.08)

(58) Field of Classification Search
CPC ........ F21S 48/217; F21S 48/218; F21S 48/24; B60Q 2400/10; B60Q 1/26; B60Q 1/30; H01L 51/5265; F21Y 2105/006; F21Y 2105/008
See application file for complete search history.

(56) References Cited

U.S. PATENT DOCUMENTS

| 5,703,436 A | * | 12/1997 | Forrest | ................... | C09K 11/06 |
| | | | | | 257/E33.056 |
| 5,757,139 A | * | 5/1998 | Forrest | ..................... | G09G 3/14 |
| | | | | | 313/504 |
| 6,046,543 A | * | 4/2000 | Bulovic | ................. | B82Y 10/00 |
| | | | | | 313/504 |

(Continued)

FOREIGN PATENT DOCUMENTS

| CN | 102939498 A | 2/2013 | |
| FR | 2956720 A1 | * 8/2011 | ............ F21S 48/115 |
| JP | 2013-045523 A | 3/2013 | |

OTHER PUBLICATIONS

Office Action dated Jun. 3, 2016, by the State Intellectual Property Office of P.R. China in counterpart Chinese Application No. 201410429082.1.

*Primary Examiner* — Anh Mai
*Assistant Examiner* — Steven Horikoshi
(74) *Attorney, Agent, or Firm* — Sughrue Mion, PLLC

(57) ABSTRACT

A vehicular lamp includes a planar light emitting member having an organic EL light emitting portion at part of a substrate, and a reflecting member and a half mirror that are disposed so as to face each other so that light emitted from the organic EL light emitting portion is reflected repeatedly while allowing part of the light to be transmitted to the front.

9 Claims, 11 Drawing Sheets

(56) References Cited

U.S. PATENT DOCUMENTS

| | | | |
|---|---|---|---|
| 2003/0057828 A1* | 3/2003 | Roitman | H01L 51/5265 |
| | | | 313/506 |
| 2004/0105047 A1* | 6/2004 | Kato | H01L 51/5265 |
| | | | 349/69 |
| 2005/0008052 A1* | 1/2005 | Nomura | H01L 27/322 |
| | | | 372/39 |
| 2005/0078486 A1* | 4/2005 | Kawaguchi | B60Q 1/26 |
| | | | 362/494 |
| 2006/0006792 A1* | 1/2006 | Strip | H01L 27/3209 |
| | | | 313/500 |
| 2009/0154184 A1* | 6/2009 | King | F21S 48/1721 |
| | | | 362/513 |
| 2009/0229153 A1* | 9/2009 | Suzuki | B60Q 3/0209 |
| | | | 40/544 |
| 2011/0149585 A1* | 6/2011 | Dubosc | F21V 13/10 |
| | | | 362/519 |
| 2012/0049723 A1* | 3/2012 | Lee | H01L 25/048 |
| | | | 313/498 |
| 2013/0010487 A1 | 1/2013 | Buisson | |
| 2013/0027956 A1* | 1/2013 | Dubosc | F21S 48/115 |
| | | | 362/511 |
| 2013/0049570 A1 | 2/2013 | Natsume | |

* cited by examiner

VEHICULAR LAMP WITH OLED HAVING REPEATED REFLECTIONS

CROSS-REFERENCE TO RELATED APPLICATION

The present application claims priorities from Japanese Patent Application No. 2013-181233 filed on Sep. 2, 2013 and Japanese Patent Application No. 2014-099824 filed on May 13, 2014, the entire content of which is incorporated herein by reference.

BACKGROUND OF THE INVENTION

Field of Invention

The present disclosure relates to a vehicular lamp that utilizes a planar light emitting member.

Related Art

Vehicular lamps are known which utilize a plane light source such as organic EL (Electroluminescent) panel. For example, Patent Document 1 discloses a vehicular lamp in which a plane light source that is formed of a strip of soft light emitting material is grounded within a lamp chamber that is defined by a housing and a transparent cover. The strip of light emitting material has a first light emitting surface that is oriented to the rear of a vehicle and a second light emitting surface which is oriented to a side of the vehicle. The first and second light emitting surfaces are designed so that light from one light emitting surface is not incident on the other light emitting surface.

PRIOR ART DOCUMENT

Patent Document

[Patent Document 1] JP-A-2013-45523

Compared with a vehicular lamp that utilizes a related-art light source and a reflector, the vehicular lamp that utilizes the plane light source described in Patent Document 1 looks less three-dimensional or deep when the lamp is observed from the front thereof, leading to a problem that the lamp is designed poor.

SUMMARY OF INVENTION

Exemplary embodiments provide a vehicular lamp using a planar light emitting member so that the viewer can feel a certain degree of depth when the vehicular lamp is observed from the front thereof.

A vehicular lamp according to an exemplar embodiment, comprises:

a planar light emitting member having an organic EL light emitting portion at part of a substrate; and a reflecting member and a half mirror that are disposed so as to face each other so that light emitted from the organic EL light emitting portion is reflected repeatedly while allowing part of the light to be transmitted to the front.

According to this aspect of the invention, it is possible to realize an external appearance that provides a certain degree of depth feeling that is produced by the repeated reflection by the use of the half mirror.

The half mirror may be disposed at the front of the planar light emitting member, and the half mirror may have such a size that the half mirror does not conceal the whole or at least part of the organic EL light emitting portion when the vehicular lamp is observed from a front thereof. According to this configuration, the high luminance intensity can be obtained by the direct light from the portion of the organic EL light emitting portion which is not concealed by the half mirror.

The reflecting member may be a cathode layer that is situated at a portion of the planar light emitting member other than the organic EL light emitting portion. According to this configuration, there is no need to provide a separate reflecting member.

A portion of the planar light emitting member other than the organic EL light emitting portion may be transparent, and the reflecting member may be a mirror that is disposed at the rear of the planar light emitting member. According to this configuration, light emitted from the organic EL light emitting portion is reflected once or more between the mirror and the half mirror to be then emitted to the front, and therefore, when the vehicular lamp is observed from the front thereof, the viewer can see a number of illumination lines and then can feel a certain degree of depth.

The half mirror may be disposed at the front of the planar light emitting member. According to this configuration, part of the light from the organic EL light emitting portion of the planar light emitting member can be emitted to the front, and the remaining light can be reflected towards the mirror.

The half mirror may be formed on a rear surface of the planar light emitting member. According to this configuration, there is no need to dispose a separate half mirror.

The mirror may have a curved surface. According to this configuration, reflected light can be diffused at a wide angle.

The vehicular lamp may further comprises a second planar light emitting member having an organic EL light emitting portion and disposed at the front of the half mirror. According to this configuration, the quantity of light of the vehicular lamp can be increased by direct light from the second planar light emitting member.

The substrate may be a light transmitting alumina substrate. According to this configuration, it is possible to provide the high-luminance organic EL light emitting portion.

According to the invention, with the vehicular lamp that utilizes the planar light emitting member, the viewer who observes the vehicular lamp from the front thereof can feel a certain degree of depth.

DETAILED DESCRIPTION

Figure 1:
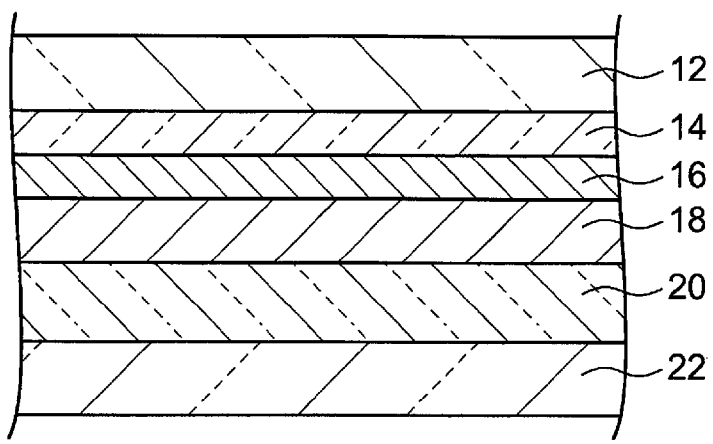
FIG. 1 is a sectional view showing a schematic configuration of an organic EL panel that is used in embodiments of the invention

FIG. 1 is a sectional view showing a schematic configuration of a light emitting portion of an organic EL panel that is used in embodiments of the invention that will be described later. The organic EL panel has a construction in which an anode layer 14 that is a transparent conductive film (for example, an ITO), a micro-reflection metallic layer 16, an organic light emitting layer 18, and a cathode layer 20 that constitutes a back-side transparent conductive film are laminated one on another between a front glass substrate 12 and a rear glass substrate 22.

A microcavity construction is formed by disposing the micro-reflection metallic layer 16 between the anode layer 14 and the organic light emitting layer 18. A distance between the micro-reflection metallic layer 16 and the cathode layer 20 is selected according to a wavelength of light emitted from the organic light emitting layer 18. In the microcavity construction, light emitted from the organic light emitting layer 18 is reflected repeatedly between the micro-reflection metallic layer 16 and the cathode layer 20, whereby only a specific wavelength that resonates is amplified. This can increase the luminance of the light emitting portion.

Figure 2A:
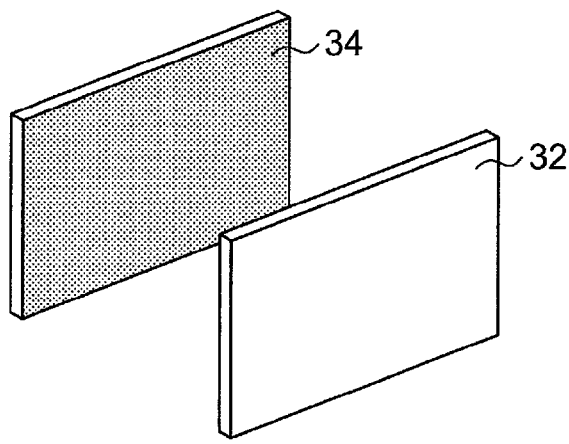
FIGS. 2A and 2B are drawings that show a vehicular lamp according to an embodiment of the invention.
Figure 2B:
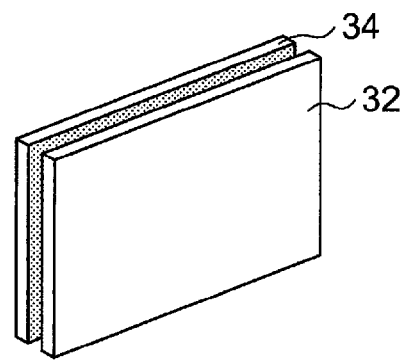

FIGS. 2A and 2B are drawings that show a vehicular lamp 30 according to an embodiment of the invention. The vehicular lamp 30 is a lamp that functions as a tail lamp and a stop lamp.

The vehicular lamp 30 is configured so that two organic EL panels that have the same external shape are superposed one on the other in a front-to-rear direction with a predetermined space defined therebetween. A front first organic EL panel 32 is a panel in which a whole surface or at least a central portion excluding a circumferential portion is transparent. A rear second organic EL panel 34 has a mirror surface that is formed on a surface of a front glass substrate through metal deposition. In the first and second organic EL panels 32, 34, the whole area constitutes a light emitting portion. A suitable material that emits red light when it is turned on is selected for organic light emitting layers of the first and second organic EL panels 32, 34.

When used as a tail lamp, in the vehicular lamp 30, the rear second organic EL panel 34 is turned on, while the front first organic EL panel 32 is not turned on. Light emitted from the second organic EL panel 34 passes through the transparent area of the first organic EL panel 32 to thereby be emitted to the front.

When the vehicular lamp 30 is used as a stop lamp, the first organic EL panel 32 and the second organic EL panel 34 are both turned on. Light emitted from a front surface of the first organic EL panel 32 is emitted directly to the front. Light emitted from the second organic EL panel 34 is partially emitted to the front though the transparent area of the first organic EL panel 32 and is partially reflected on a rear glass substrate of the first organic EL panel 32 to thereby be reflected on the mirror surface of the second organic EL panel 34. Part of the reflected light passes through the transparent area of the first organic EL panel 32 and is then emitted to the front. The remaining light is reflected again towards the second organic EL panel 34. The viewer who stands in front of the vehicular lamp 30 can feel a certain degree of depth in the stop lamp as a result of the light being reflected once or a plurality of times between the first organic EL panel 32 and the second organic EL panel 34 in the way described above.

The function that is given to the first and second organic EL panels 32, 34 is not limited to the combination described above, and hence, an arbitrary combination can be selected from, for example, a clearance lamp, a daytime running lamp, a turn signal lamp, a tail lamp, a stop lamp, and the like.

Figure 3A:
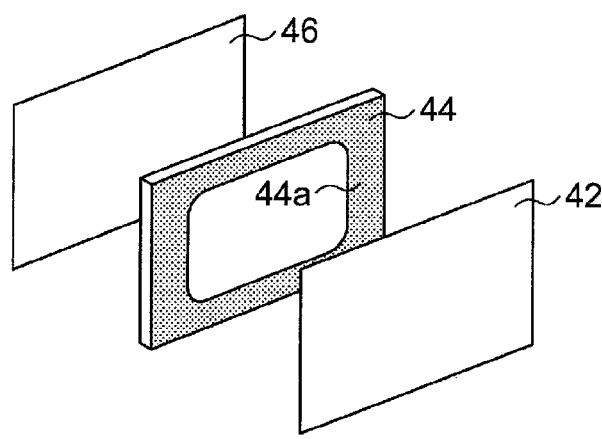
FIGS. 3A and 3B are drawings showing a vehicular lamp according to another embodiment of the invention.
Figure 3B:
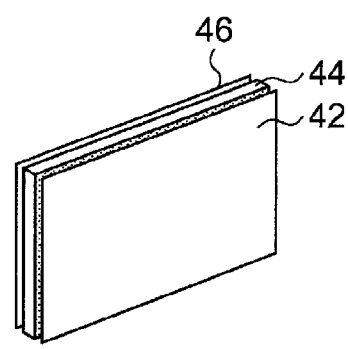

FIGS. 3A and 3B are drawings showing a vehicular lamp 40 according to another embodiment of the invention. The vehicular lamp 40 includes a single organic EL panel 44. In the organic EL panel 44, an annular light emitting portion 44a is provided only at a circumferential edge portion of a glass substrate, and an area radially inside the annular light emitting portion 44 is formed as a transparent area. A half mirror 42 is disposed at the front of the organic EL panel 44 with a predetermined space defined therebetween. Additionally, a total reflecting mirror 46 is disposed at the rear of the organic EL panel 44 with a predetermined space defined therebetween.

When the organic EL panel 44 is turned on, part of light emitted from front and rear surfaces of the light emitting portion 44a passes through the transparent area at the center of the organic EL panel 44 to thereby be reflected once or a plurality of times between the half mirror 42 and the total reflecting mirror 46. Then, part of the reflected light is emitted to the front from the half mirror 42. As a result of this, the viewer who stands in front of the vehicular lamp 40 observes annular illumination lines extending in a telescopic fashion with diameters of the annular illumination lines gradually decreasing from a near side to a far side. Therefore, the viewer can feel a certain degree of depth in the vehicular lamp 40.

Figure 4A:
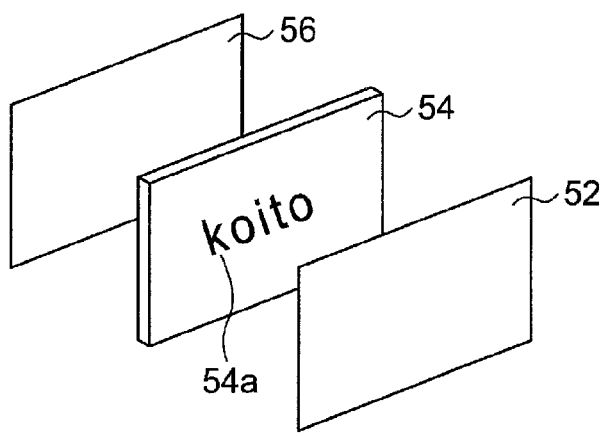
FIGS. 4A and 4B are drawings showing a vehicular lamp according to a further embodiment of the invention.
Figure 4B:
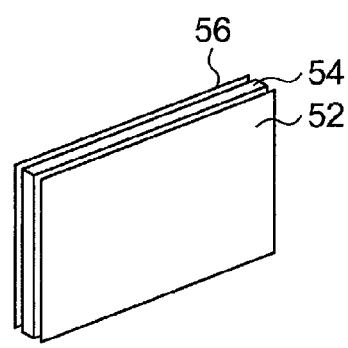

FIGS. 4A and 4B are drawings showing a vehicular lamp 50 according to a further embodiment of the invention. This vehicular lamp 50 is similar to the vehicular lamp 40 of the another embodiment as shown in FIG. 3 in that a half mirror 52 is disposed at the front of an organic EL panel 54 with a predetermined space defined therebetween and a total reflecting mirror 56 is disposed at the rear of the organic EL panel 54 with a predetermined space defined therebetween. However, a logo is formed of a strip-shaped light emitting portion 54a on the organic EL panel 54 of this embodiment, and the other area of the organic EL panel 54 than this logo is formed as a transparent area.

When the light emitting portion 54a of the organic EL panel 54 is turned on, part of light emitted from front and rear surfaces of the light emitting portion 54a is reflected once or a plurality of times between the half mirror 52 and the total reflecting mirror 56. Then, part of the reflected light is emitted to the front from the half mirror 52. As a result of this, the viewer who stands in front of the vehicular lamp 50 observes a number of logos which gradually decrease in size from a near side to a far side. Therefore, the viewer can feel a certain degree of depth in the vehicular lamp 50, and the characteristic design including a number of logos can be realized.

Figure 5A:
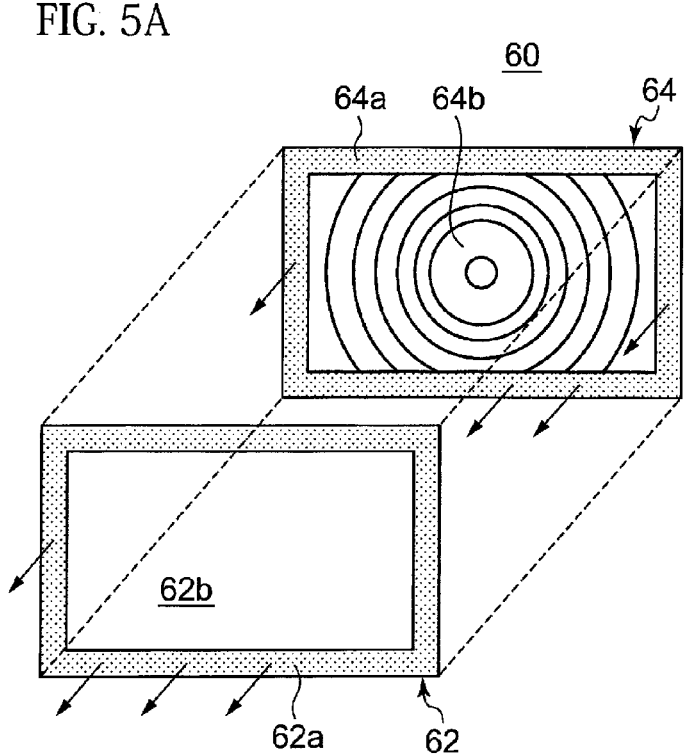
FIGS. 5A and 5B are drawings showing a vehicular lamp according to a further embodiment of the invention.
Figure 5B:
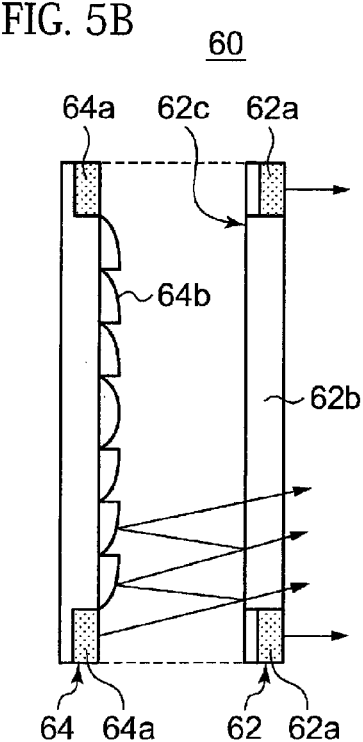

FIGS. 5A and 5B are drawings showing a vehicular lamp 60 according to a further embodiment of the invention. The vehicular lamp 60 is configured so that two organic EL panels that have the same external shape are superposed one on the other in a front-to-rear direction with a predetermined space defined therebetween.

An annular light emitting portion 62a is formed only at a circumferential edge portion on a front first organic EL panel 62, and an area defined radially inside the annular light emitting portion 62a is formed as a transparent area 62b. The light emitting portion 62a emits light to the front only. A half mirror surface 62c is formed on a rear surface of the first organic EL panel 62 through metal deposition.

An annular light emitting portion 64a is also formed only at a circumferential edge portion of the rear second organic EL panel 64. A Fresnel reflecting surface 64b is disposed radially inside the annular light emitting portion 64a.

When the first organic EL panel 62 and the second organic EL panel 64 are turned on at the same time, as shown in a sectional view of FIG. 5B, light is emitted to the front from the light emitting portion 62a of the first organic EL panel 62. Part of light emitted from the second organic EL panel 64 passes through the transparent area 62b of the first organic EL panel 62 to thereby be emitted directly to the front. Additionally, part of the light from the second organic EL panel 64 is reflected on the half mirror surface 62c on the rear surface of the first organic EL panel 62 and is then reflected again to the front on the Fresnel reflecting surface 64b of the second organic EL panel 64. The reflected light is reflected once or is reflected repeatedly a plurality of times between the half mirror surface 62c and the Fresnel reflecting surface 64b and is then emitted to the front at a ratio according to the transmissivity of the half mirror surface 62c.

As a result of this, the viewer who stands in front of the vehicular lamp 60 observes annular illumination lines extending in a telescopic fashion with diameters of the annular illumination lines gradually decreasing from a near side to a far side. This enables the viewer to feel a certain degree of depth that is deeper than an actual depth of the vehicular lamp 60 or a certain degree of three-dimensional appearance although the vehicular lamp 60 is a thin lamp made up of the two organic EL panels. Additionally, the shape of the Fresnel reflecting surface is changed so that the annular illumination lines are disposed at equal intervals, whereby the illumination lines are allowed to look like a tunnel of illumination, and alternatively, the illumination lines are allowed to look like a bowl by narrowing the intervals at a near side and broadening the intervals at a far side.

In place of the Fresnel reflecting surface on the second organic EL panel, a flat mirror may be disposed, or a convex mirror may be disposed. Although the Fresnel reflecting mirror is superior to the convex mirror in that the thickness can be reduced, due to an inherent possibility of an image being distorted at a step portion of the lens, when the thickness of the lamp is allowed to be increased, it is preferable that the convex mirror is used in place of the Fresnel reflecting surface.

Figure 6A:
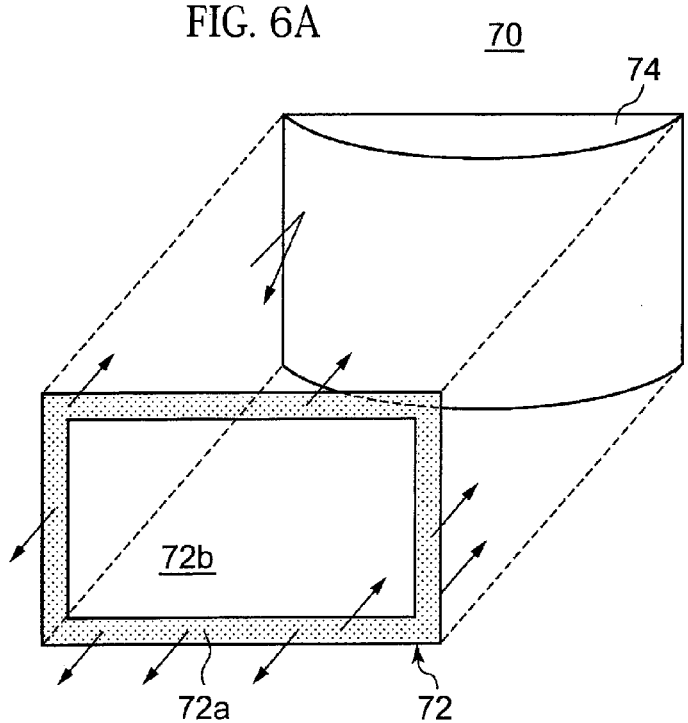
FIGS. 6A and 6B are drawings showing a vehicular lamp according to a further embodiment of the invention.
Figure 6B:
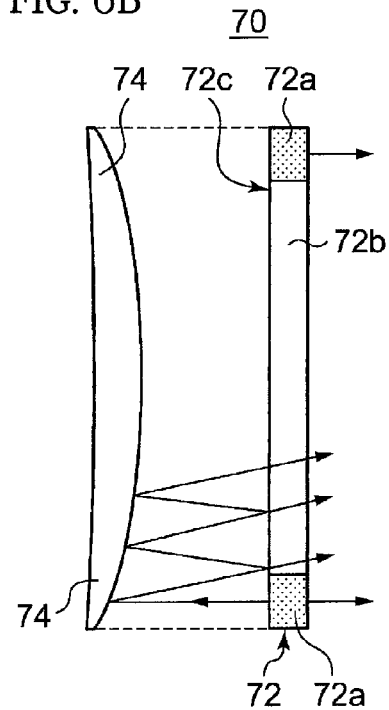

FIGS. 6A and 6B are drawings showing a vehicular lamp 70 according to a further embodiment of the invention. The vehicular lamp 70 includes a single organic EL panel 72. The organic EL panel 72 has an annular light emitting portion 72a that is provided only at a circumferential edge portion of a glass substrate. An area radially inside the annular light emitting portion 72a is formed into a transparent area 72b. The light emitting portion 72a emits light both to the front and rear. A half mirror surface 72c is formed on a rear surface of the organic EL panel 72 through metal deposition. Further, a convex mirror 74 that projects more at a central portion than at both end portions is disposed at the rear of the organic EL panel 72 with a predetermined space defined therebetween.

When the organic EL panel 72 is turned on, as shown in a sectional view in FIG. 6B, light is emitted to the front from the light emitting portion 72a. Light emitted from the light emitting portion 72a to the rear is reflected to the front on the convex mirror 74. The reflected light is emitted to the front at a ratio according to the transmissivity of the half mirror surface 72c while being reflected once or a plurality of times repeatedly between the half mirror surface 72c of the organic EL panel 72 and the convex mirror 74.

As a result, the viewer who stands in front of the vehicular lamp 70 observes annular illumination lines extending in a telescopic fashion with diameters of the annular illumination lines gradually decreasing from a near side to a far side. Therefore, the viewer can feel a certain degree of depth that is deeper than an actual depth of the lamp or a certain degree of three-dimensional appearance in the vehicular lamp 70, although the vehicular lamp 70 is a thin lamp made up only of the organic EL panel and the convex mirror. Additionally, utilizing the convex mirror can diffuse the reflected light at a wider angle. In addition, since the light emitted to the rear from the light emitting portion of the organic EL panel is made effective use of, the light emitting efficiency of the whole vehicular lamp can be enhanced, leading to the conservation of energy.

A Fresnel reflecting surface may be disposed in place of the convex mirror.

Thus, as has been described heretofore, with the vehicular lamps shown in FIGS. 3A to 6B, compared with a vehicular lamp that utilizes a related-art light source and a reflector, the viewer who observes the vehicular lamp is allowed to feel a certain degree of depth while reducing the dimension in the depth direction of the lamp.

Figure 7:
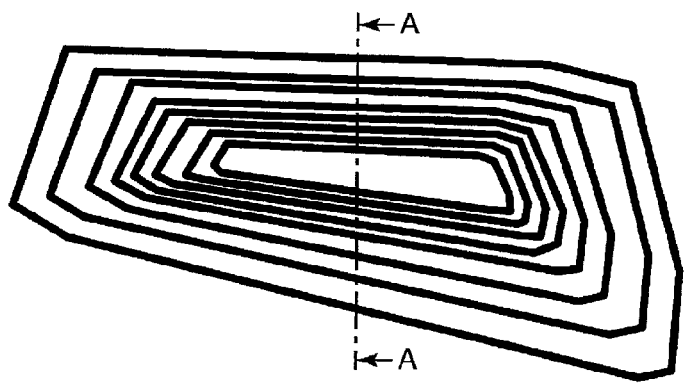
FIG. 7 is a drawing showing illumination lines that are observed by the viewer when the viewer stands in front of vehicular lamps according to embodiments of the invention that will be described below by reference to FIGS. 8 to 11.

FIG. 7 is a drawing showing illumination lines that are observed by the viewer when the viewer stands in front of vehicular lamps according to embodiments of the invention that will be described below by reference to FIGS. 8 to 11. With these vehicular lamps, as shown in FIG. 7, annular illumination lines are observed which extend in a telescopic fashion with diameters of the annular illumination lines gradually decreasing from a near side to a far side.

Figure 8:
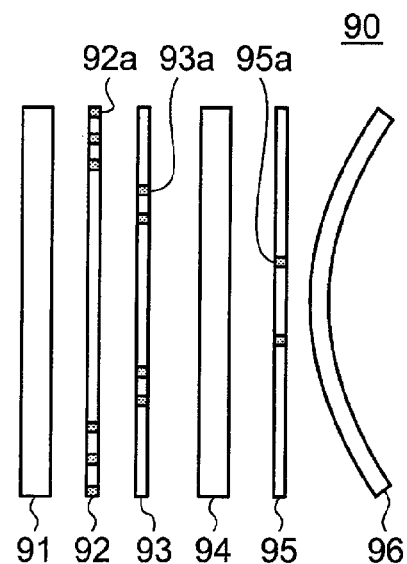
FIG. 8 is a schematic sectional view of a vehicular lamp according to an embodiment of the invention that results when the annular illumination pattern shown in FIG. 7 is cut along the line A-A.

FIG. 8 is a schematic sectional view of a vehicular lamp 90 according to an embodiment of the invention that results when the annular illumination pattern shown in FIG. 7 is cut along the line A-A. The vehicular lamp 90 includes, from the front to the rear, an outer lens 91, a first organic EL panel 92, a second organic EL panel 93, a half mirror 94, a third organic EL panel 95, and a convex mirror 96. The half mirror 94 and the convex mirror 96 are formed through metal deposition on to, for example, a glass substrate.

The first and third organic EL panels have annular light emitting portions 92a, 93a, 95a, respectively. In the first organic EL panel 92, one or a plurality of (three in this embodiment) light emitting portions 92a are disposed at an outermost circumference of the panel. In the second organic EL panel 93, one or a plurality of (two in this embodiment) light emitting portions 93a are disposed radially inwards of the light emitting portions 92a of the first organic EL panel 92. In the third organic EL panel 95, one or a plurality of (one in this embodiment) light emitting portion 95a is disposed radially inwards of the light emitting portions 93a of the second organic EL panel 93. The first to third organic EL panels including their light emitting portions are formed transparent.

When the first to third organic EL panels are all turned on, light is emitted directly to the front from the light emitting portions 92a of the first organic EL panel 92 and the light emitting portions 93a of the second organic EL panel 93 through the outer lens. On the other hand, since the half mirror 94 is disposed at the front of the third organic EL panel 95, light emitted from the light emitting portion 95a of the third organic EL panel 95 is reflected once or a plurality of times repeatedly between the half mirror 94 and the convex mirror 96 and is then emitted to the front at a ratio according to the transmissivity of the half mirror.

As a result, the viewer who stands in front of the vehicular lamp 90 observes annular illumination lines produced by the light reflected between the half mirror 94 and the convex mirror 96 in addition to annular illumination lines produced by the direct light from the light emitting portions of the first and second organic EL panels. Consequently, the viewer is allowed to see a larger number of annular illumination lines than an actual number of annular light emitting portions, whereby the viewer can feel a certain degree of depth that is deeper than an actual depth of the vehicular lamp or a certain degree of three-dimensional appearance. Light is directly emitted from the light emitting portions of the first and second organic EL panels, and therefore, it is possible to ensure a quantity of light that is required on the vehicular lamp. In addition, compared with a case where an LED, a light guide or an edge light is used, the annular illumination lines emit uniformly, and no break is produced in the illumination lines. Thus, a good appearance is realized by this vehicular lamp 90.

Figure 9:
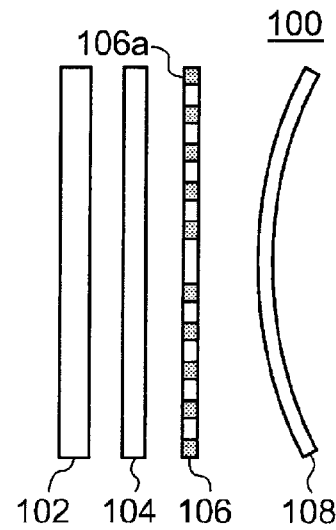
FIG. 9 is a schematic sectional view of a vehicular lamp according to another embodiment of the invention that results when the annular illumination pattern shown in FIG. 7 is cut along the line A-A.

FIG. 9 is a schematic sectional view of a vehicular lamp 100 according to another embodiment of the invention that results when the annular illumination pattern shown in FIG. 7 is cut along the line A-A. The vehicular lamp 100 includes, from the front to the rear, an outer lens 102, a half mirror 104, an organic EL panel 106, and a convex mirror 108. The half mirror 104 and the convex mirror 108 are formed through metal deposition on to, for example, a glass substrate.

In this embodiment, a plurality of concentric annular light emitting portions 106a are formed from an outer circumference towards a central portion of the organic EL panel 106. The organic EL panel 106 including the light emitting portions is formed transparent.

When the organic EL panel 106 is turned on, part of light emitted from the individual annular light emitting portions 106a passes through the half mirror 104 to be emitted to the front, while the remaining light is reflected once or a plurality of times repeatedly between the half mirror 104 and the convex mirror 108 and is then emitted to the front at a ratio according to the transmissivity of the half mirror 104.

As a result, the viewer who stands in front of the vehicular lamp 100 observes a number of annular illumination lines by the light reflected between the half mirror 104 and the convex mirror 108. Consequently, the viewer is allowed to see a larger number of illumination lines than the number of annular light emitting portions, and hence, the viewer can feel a certain degree of depth in the vehicular lamp 100.

Figure 10:
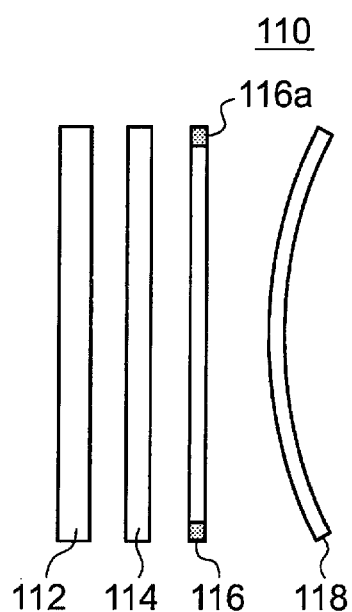
FIG. 10 is a schematic sectional view of a vehicular lamp according to a further embodiment of the invention that results when the annular illumination pattern shown in FIG. 7 is cut along the line A-A.

FIG. 10 is a schematic sectional view of a vehicular lamp 110 according to a further embodiment of the invention that results when the annular illumination pattern shown in FIG. 7 is cut along the line A-A. Similar to the vehicular lamp 100 shown in FIG. 9, the vehicular lamp 110 includes, from the front to the rear, an outer lens 112, a half mirror 114, an organic EL panel 116, and a convex mirror 118.

In this embodiment, only one annular light emitting portion 116a is formed at an outer circumference of the organic EL panel 116. The organic EL panel 116 including the light emitting portion is formed transparent.

When the organic EL panel 116 is turned on, part of the light emitted from the annular light emitting portion 116a passes through the half mirror 114 and is then emitted to the front, while the remaining light is reflected once or a plurality of times repeatedly between the half mirror 114 and the convex mirror 118 and is then emitted to the front at a ratio according to the transmissivity of the half mirror 114.

As a result, the viewer who stands in front of the vehicle mirror 110 observes a number of annular illumination lines produced by the reflected light reflected between the half mirror 114 and the convex mirror 118. Consequently, although the quantity of light emitted from this vehicular lamp 110 becomes smaller than the quantity of light emitted from the vehicular lamp of the embodiment shown in FIG. 9, the viewer can see a number of illumination lines with the small number of light emitting portions (in this embodiment, a single light emitting portion) to thereby be able to feel a certain degree of depth in the vehicular lamp 110.

Figure 11:
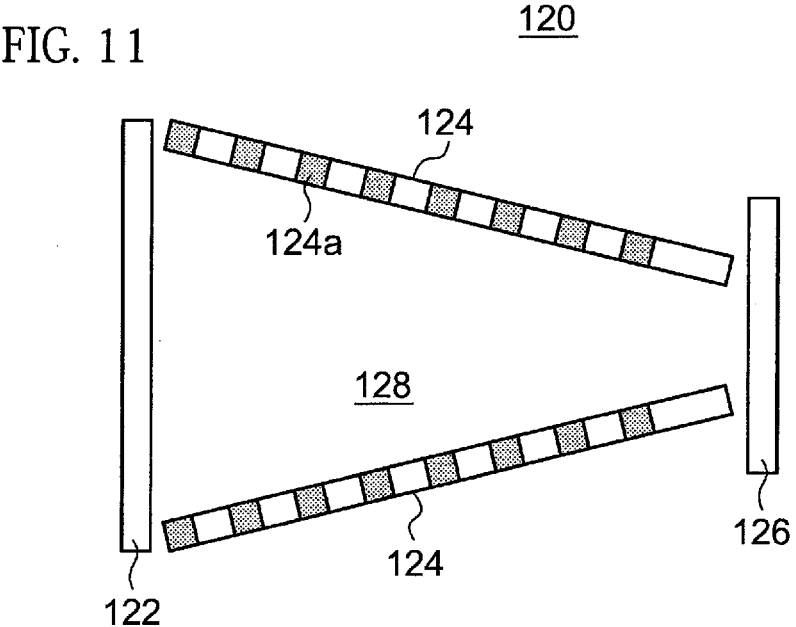
FIG. 11 is a schematic sectional view of a vehicular lamp according to a further embodiment of the invention that results when the annular illumination pattern shown in FIG. 7 is cut along the line A-A.

FIG. 11 is a schematic sectional view of a vehicular lamp 120 according to a further embodiment of the invention that results when the annular illumination pattern shown in FIG. 7 is cut along the line A-A. In this embodiment, a cylindrical lamp chamber 128 is formed by combining a plurality of plate-shaped organic EL panels 124. The cylindrical lamp chamber 128 is formed so that sectional shapes are gradually smaller from a near side towards a far side while keeping similarity in shape. A plurality of light emitting portions 124a are formed in each organic EL panel 124, and the organic EL panels 124 are combined so that the light emitting portions 124a of the adjacent organic EL panels 124 form annular illumination lines.

When the organic EL panels 124 are turned on, the viewer who stands in front of the vehicular lamp 120 observes annular illumination lines extending in a telescopic fashion with diameters of the annular illumination lines gradually decreasing from a near side to a far side shown in FIG. 7.

In place of the combined plate-shaped organic EL panels, a single organic EL panel that can be bent into a cylindrical shape may be used to form a cylindrical lamp chamber by rounding the same panel.

When the vehicular lamps of the embodiments described heretofore are used as a tail lamp, a problem is caused that it is difficult to satisfy the luminous intensity specified by the regulation on tail lamps.

It is considered that the area of a light emitting portion of an organic EL panel is expanded or the number of organic EL panels is increased in order to satisfy the required luminous intensity. However, these techniques not only make it difficult to produce vehicular lamps but also increase the production costs.

Then, in embodiments that will be described below, vehicular lamps will be described in which ensuring the luminous intensity required for tail lamps to satisfy under the related regulation is compatible with an external appearance which enables the viewer to feel a certain degree of depth by using one organic EL panel.

Figure 12A:
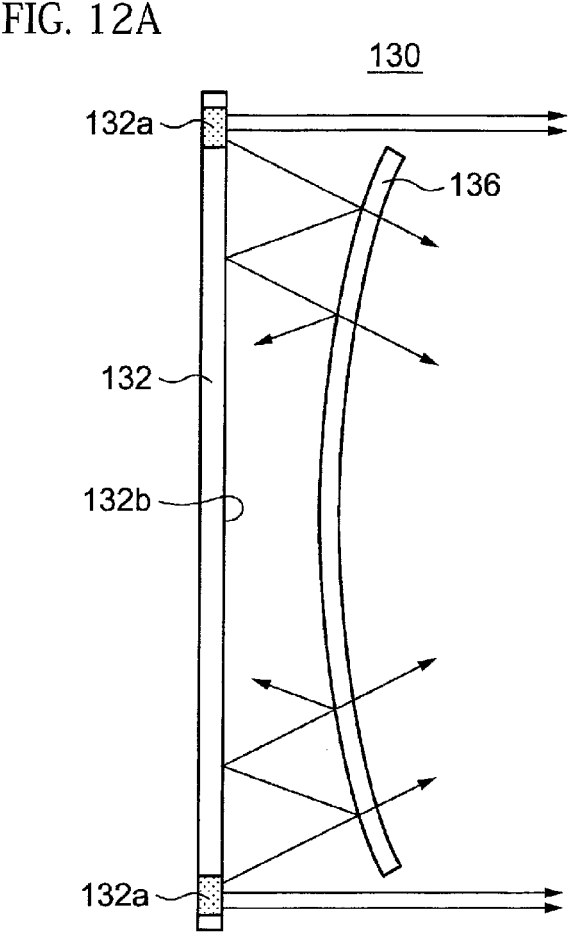
FIG. 12A is a schematic sectional view of a vehicular lamp according to a further embodiment of the invention and FIG. 12B is a drawing showing the vehicular lamp observed from the front.

FIG. 12A is a schematic sectional view of a vehicular lamp 130 according to a further embodiment of the invention. The vehicular lamp 130 is formed by providing an organic EL panel 132 and a half mirror 136 so as to be aligned with each other in a front-to-rear direction with a predetermined space defined therebetween. The half mirror 136 is formed curvilinearly so as to have a convex surface on a side facing the organic EL panel 132.

An annular light emitting portion 132a is formed only at a circumferential edge portion of the organic EL panel 132. An area radially inside the light emitting portion 132a on a half mirror side of the organic EL panel 132 is formed into a mirror surface 132b. The mirror surface 132b may be formed through metal deposition, or a cathode layer of the organic EL panel 132 may be formed of aluminum, and the resulting cathode layer may be made use of as a mirror surface.

The half mirror 136 is prepared in such a size that when the vehicular lamp 130 is observed from the front thereof, the whole or most of the half mirror 136 is positioned within the annular light emitting portion 132a of the organic EL panel 132 and that the whole of the light emitting portion 132a is not concealed or most of the light emitting portion 132a is not concealed by the half mirror 136.

When the organic EL panel 132 is turned on, direct light from the light emitting portion 132a is not affected at all by the half mirror 136, and therefore, light with high luminance intensity is emitted to the front.

Light emitted from an organic EL material becomes diffuse light, and therefore, part of light that is emitted obliquely from the light emitting portion 132a towards a central side of the organic EL panel 132 is incident on the half mirror 136. Part of this light passes through the half mirror 136, and the remaining light is reflected towards the mirror surface 132b of the organic EL panel 132. The reflected light is reflected once or a plurality of times repeatedly between the half mirror 136 and the mirror surface 132b and is then emitted to the front at a ratio according to the transmissivity of the half mirror 136.

Figure 12B:
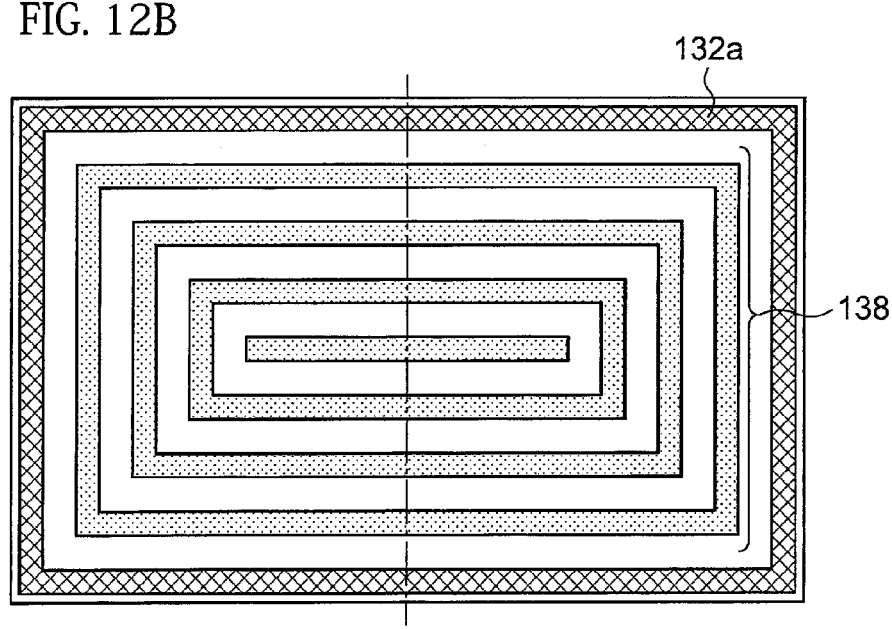

FIG. 12B is a drawing showing how the vehicular lamp 130 is seen when the vehicular lamp 130 is observed from the front (from a right-hand side in FIG. 12A) thereof with the organic EL panel 130 turned on. As shown therein, the viewer who stands in front of the vehicular lamp 130 observes annular illumination lines 138 extending in a telescopic fashion with diameters of the annular illumination lines 138 gradually decreasing from a near side to a far side. This enables the viewer to feel a certain degree of depth that is deeper than an actual depth of the vehicular lamp 130 or a certain degree of three-dimensional appearance although the vehicular lamp 130 is a thin lamp. Further, high-intensity direct light is emitted from the light emitting portion 132a, and therefore, the luminous intensity that can satisfy the luminous intensity specified by the related regulation can be ensured also when the vehicular lamp 130 is used as a tail lamp.

In this way, in this embodiment, it is possible to produce the direct light that is required to satisfy the requirement of the related regulation and the incident light on the half mirror by using the single organic EL panel.

Figure 13:
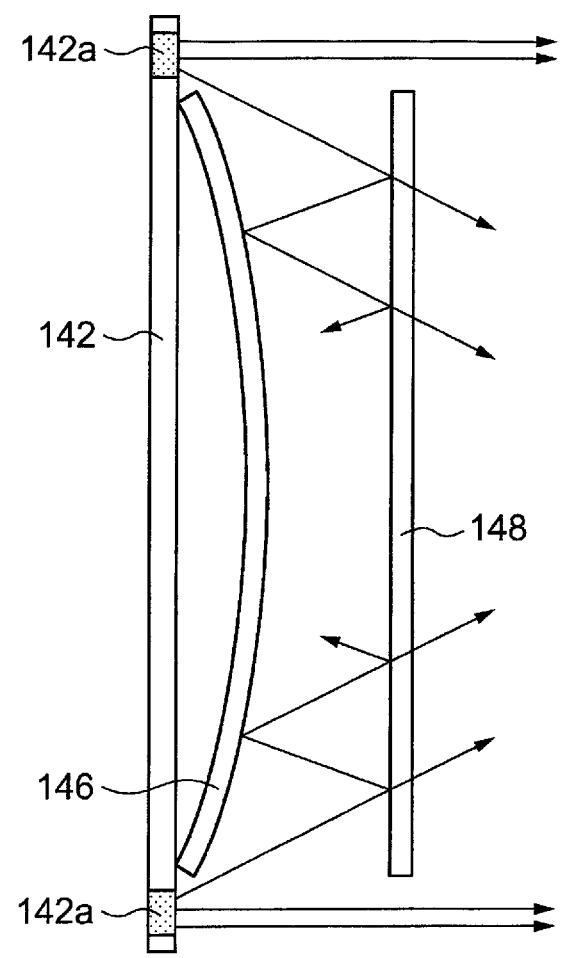
FIG. 13 is a schematic sectional view of a vehicular lamp according to a further embodiment of the invention.

FIG. 13 is a schematic sectional view of a vehicular lamp 140 according to a further embodiment of the invention. The vehicular lamp 140 includes an organic EL panel 142, a flat half mirror 148, and a curved mirror 146 that is curved so that a convex surface is formed on a side facing the half mirror 148.

An annular light emitting portion 142a is formed only at a circumferential edge portion of the organic EL panel 142. The mirror 146 is disposed in an area lying radially inside the light emitting portion 142a.

The half mirror 148 is prepared in such a size that when the vehicular lamp 140 is observed from the front thereof, the whole or most of the half mirror 148 is positioned within the annular light emitting portion 142a of the organic EL panel 142 and that the whole of the light emitting portion 142a is not concealed or most of the light emitting portion 142a is not concealed by the half mirror 148.

When observed from the front thereof, the convex mirror 146 is sized so that the whole of the convex mirror 146 is positioned within the annular light emitting portion 142a and is disposed between the organic EL panel 142 and the half mirror 148. The mirror surface and the half mirror may be formed through meal deposition, for example.

When the organic EL panel 142 is turned on, direct light from the light emitting portion 142a is not affected at all by the half mirror 148, and therefore, the direct light with high luminance intensity is emitted to the front.

Light emitted from an organic EL material becomes diffuse light, and therefore, part of light that is emitted obliquely from the light emitting portion 142a towards a central side of the organic EL panel 142 is incident on the half mirror 148. Part of this light passes through the half mirror 148, and the remaining light is reflected towards the mirror 146 having the convex surface. The reflected light is reflected once or a plurality of times repeatedly between the half mirror 148 and the mirror 146 and is then emitted to the front at a ratio according to the transmissivity of the half mirror 148.

As a result, similar to the vehicular lamp shown in FIG. 12B, the viewer who stands in front of the vehicular lamp 140 observes annular illumination lines extending in a telescopic fashion with diameters of the annular illumination lines gradually decreasing from a near side to a far side. This enables the viewer to feel a certain degree of depth that is deeper than an actual depth of the vehicular lamp 140 or a certain degree of three-dimensional appearance although the vehicular lamp 140 is a thin lamp. Further, since the high-intensity direct light is emitted from the light emitting portion 142a, it is possible to ensure the luminous intensity that satisfies the luminous intensity specified by the related regulation also when the vehicular lamp 140 is used as a tail lamp, for example.

In this way, in this embodiment, it is possible to produce the direct light that is required to satisfy the requirement of the related regulation and the incident light on the half mirror by using the single organic EL panel.

The shape of the half mirror 136 in FIG. 12A or the shape of the mirror 146 in FIG. 13 is changed so that the annular illumination lines are disposed at equal intervals, whereby the illumination lines are allowed to look like a tunnel of illumination (light tunnel). Alternatively, the illumination lines are allowed to look like a bowl by narrowing the intervals at a near side and broadening the intervals at a far side. The half mirror 148 does not have to be the flat surface and hence may be formed into a convex surface. As this occurs, the reduction ratio of a virtual image changes, and therefore, illumination lines are observed which are different from those produced by the flat half mirror 148.

In the vehicular lamps shown in FIGS. 12A, 12B and 13, the annular light emitting portion is provided only at the circumferential edge of the organic EL panel. In contrast to this, even though such a light emitting portion is provided at the center of the organic EL panel, a similar working effect can be obtained.

Figure 14A:
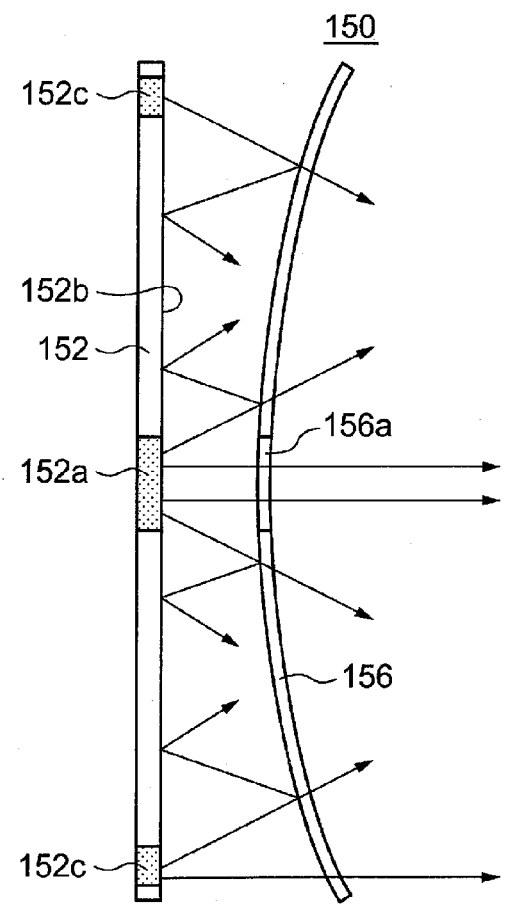
FIG. 14A is a schematic sectional view of a vehicular lamp according to a further embodiment of the invention and FIG. 14B is a drawing showing the vehicular lamp observed from the front.

FIG. 14A is a schematic sectional view of a vehicular lamp 150 according to a further embodiment of the invention. The vehicular lamp 150 includes an organic EL panel 152 and a half mirror 156 which are aligned with each other in a front-to-rear direction with a predetermined space defined therebetween. The half mirror 156 is formed curvilinearly so as to have a convex surface on a side facing the organic EL panel.

A linear light emitting portion 152a is formed only at the center of the organic EL panel 152. A mirror surface 152b is formed on a side of the organic EL panel 152 that faces the half mirror at an area other than the area where the light emitting portion 152a is formed. The mirror surface 152b may be formed through metal deposition. Alternatively, a cathode layer of the organic EL panel 152 is formed of aluminum, and this cathode layer may be made use of a mirror surface.

The half mirror 156 is prepared in such a size as to cover almost the whole of the organic EL panel 152 when the vehicular lamp 150 is observed from the front thereof. A transparent area 156a is formed at an area of the half mirror 156 which is superposed on the light emitting portion 152a, and no metal deposition is applied to a surface of the transparent area 156a.

When the organic EL panel 152 is turned on, direct light from the light emitting portion 152a passes through the transparent area 156a of the half mirror 156 and is then emitted to the front as light with high luminance intensity.

Part of the light emitted obliquely from the light emitting portion 152a towards a circumferential edge side of the organic EL panel is incident on the half mirror 156. Part of this light passes through the half mirror 156, and the remaining light is reflected towards the mirror surface 152b of the organic EL panel 152. The reflected light is reflected once or a plurality of times repeatedly between the half mirror 156 and the mirror surface 152b and is then emitted to the front at a ratio according to the transmissivity of the half mirror 156.

Figure 14B:
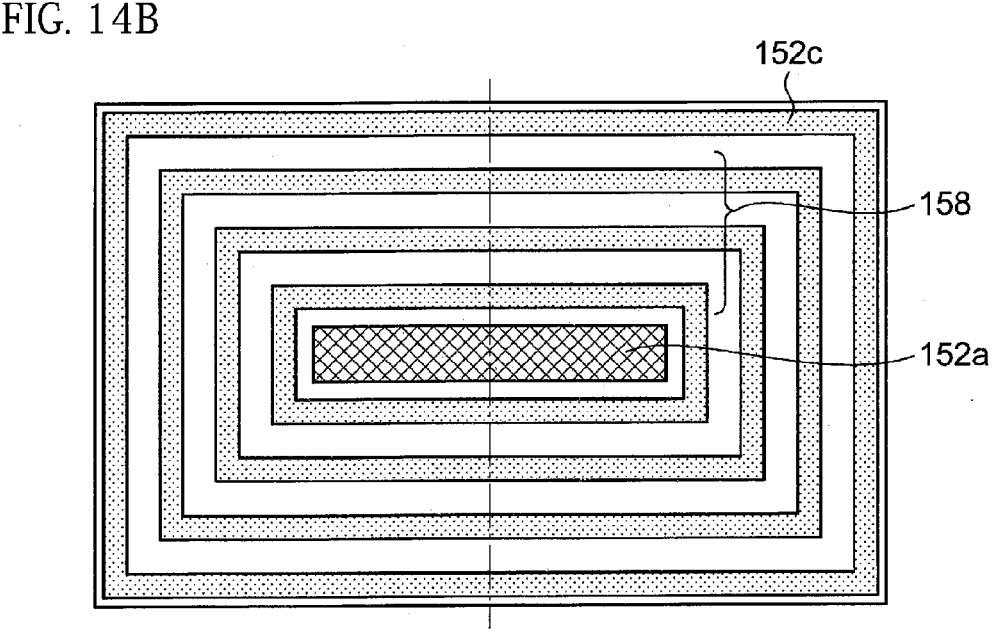

FIG. 14B is a drawing showing how the organic EL panel 152 shines when it is turned on in the event that the vehicular lamp 150 is observed from the front (a right-hand side in FIG. 14A) thereof. As shown therein, the viewer who stands in front of the vehicular lamp 150 observes annular illumination lines 158 extending in a telescopic fashion with diameters of the illumination lines gradually increasing from a near side to a far side. This enables the viewer to feel a certain degree of depth that is deeper than an actual depth of the vehicular lamp 150 or a certain degree of three-dimensional appearance, although the vehicular lamp 150 is a thin lamp. Further, the high-intensity direct light is emitted from the light emitting portion 152a, and therefore, it is possible to ensure the luminous intensity that satisfies the luminous intensity specified by the related regulation also when the vehicular lamp 150 is used as a tail lamp.

In this way, in this embodiment, it is possible to produce not only the direct light required to satisfy the requirement of the related regulation but also the light that is incident on the half mirror by using one organic El panel.

In addition to the central light emitting portion 152a, a light emitting portion 152c may be provided at a circumferential edge portion of the organic EL panel 152 as done in the embodiments shown in FIGS. 12A, 12B and 13. By adopting this configuration, a light tunnel is formed by both the light from the light emitting portion 152a and the light from the light emitting portion 152c, and therefore, annular illumination lines can be formed in a more complex fashion.

The direct light and the incident light on the half mirror are described as being produced by the single light emitting portion by reference to FIGS. 12A to 14B. However, a light emitting portion for direct light and a light emitting portion for incident light that is incident on the half mirror may be provided separately.

Figure 15A:
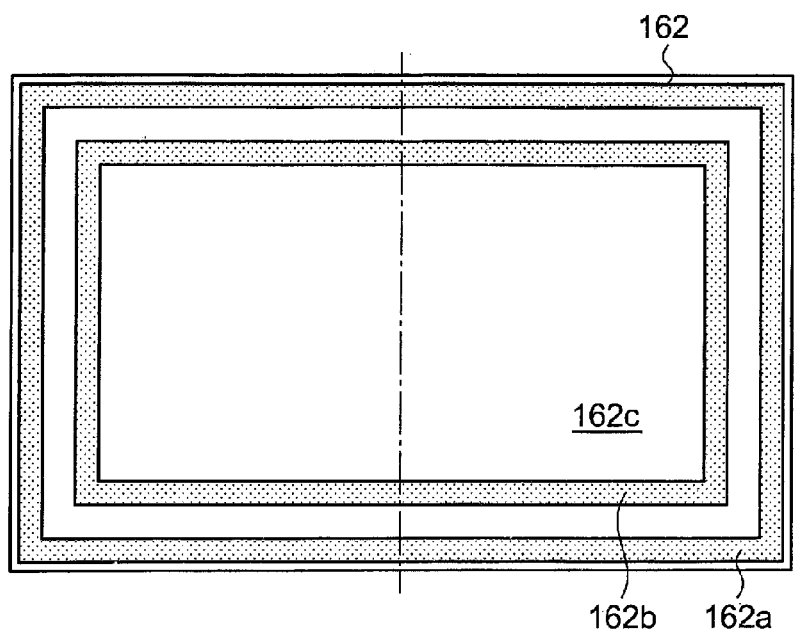
FIG. 15A is a front view of such a vehicular lamp according to a further embodiment of the invention.
Figure 15B:
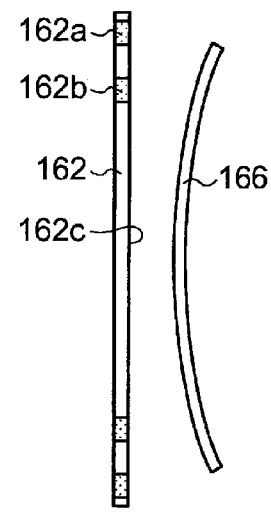
FIG. 15B is a sectional view of the vehicular lamp.

FIG. 15A is a front view of such a vehicular lamp 160, and FIG. 15B is a sectional view of the vehicular lamp 160. The vehicular lamp 160 is formed by aligning an organic EL panel 162 with a half mirror 166 so as to be superposed one on the other in a front-to-rear direction with a predetermined space defined therebetween. The half mirror 166 is formed curvilinearly so that an organic EL panel side thereof constitutes a convex surface.

Two annular light emitting portions 162a, 162b are formed on the organic EL panel 162. A mirror surface 162c is formed at an area lying radially inwards of the light emitting portion 162b.

The light emitting portion 162a on an outer circumferential side is a light emitting portion for forming direct light, and the light emitting portion 162b on an inner circumferential side is a light emitting portion which produces light that is reflected a plurality of times between the half mirror 166 and the mirror surface 162c to produce annular illumination lines (a light tunnel). The luminous intensity of the light tunnel can be enhanced by providing the separate light emitting portions in the way described above.

Figure 15C:
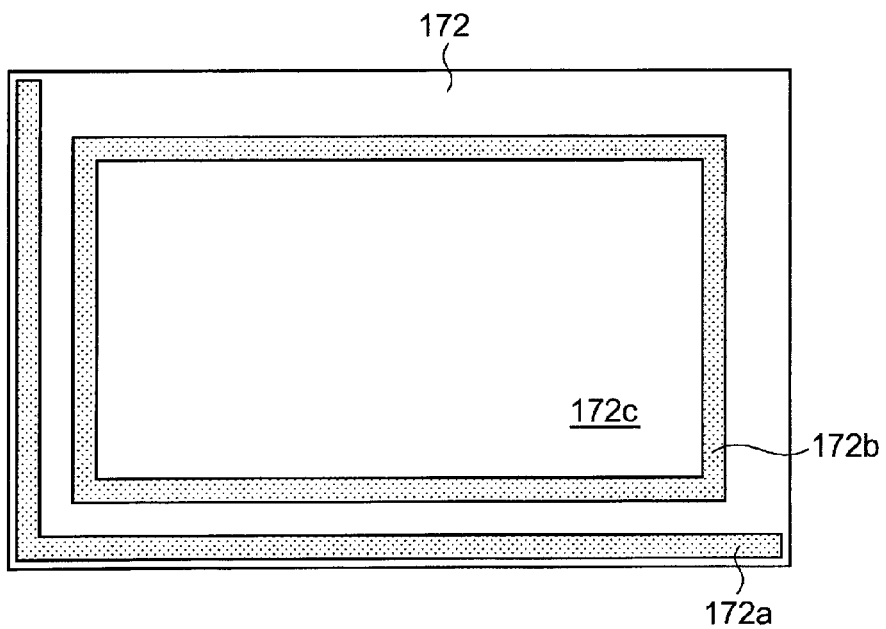
FIG. 15C is a front view of such a vehicular lamp according to a further embodiment of the invention.

FIG. 15C is a front view of a vehicular lamp 170 in which light emitting portions are separated into a light emitting portion for emitting direct light and a light emitting portion for emitting light incident on a half mirror. Similar to the vehicular lamp 160, the vehicular lamp 170 is formed by aligning an organic EL panel 172 with a half mirror (not shown) so as to be superposed one on the other in a front-to-rear direction with a predetermined space defined therebetween. The half mirror is formed curvilinearly so that an organic EL panel side thereof constitutes a convex surface.

An L-shaped light emitting portion 172a is formed on the organic EL panel 172, and an annular light emitting portion 172b is formed radially inwards of the L-shaped light emitting portion 172a. A mirror surface 172c is formed radially inwards of the light emitting portion 172b.

The light emitting portion 172a on an outer circumferential side is a light emitting portion for forming direct light, which forms an L-shaped luminous line. The light emitting portion 172b on an inner circumferential side is a light emitting portion that emits light that is reflected a plurality of times between the half mirror and the mirror surface 172c to form annular illumination lines (light tunnel).

Thus, as has been described heretofore, when the organic EL panel is used as the vehicular lamp, the light emitting portion is required to emit light with high luminance intensity.

Figure 16:
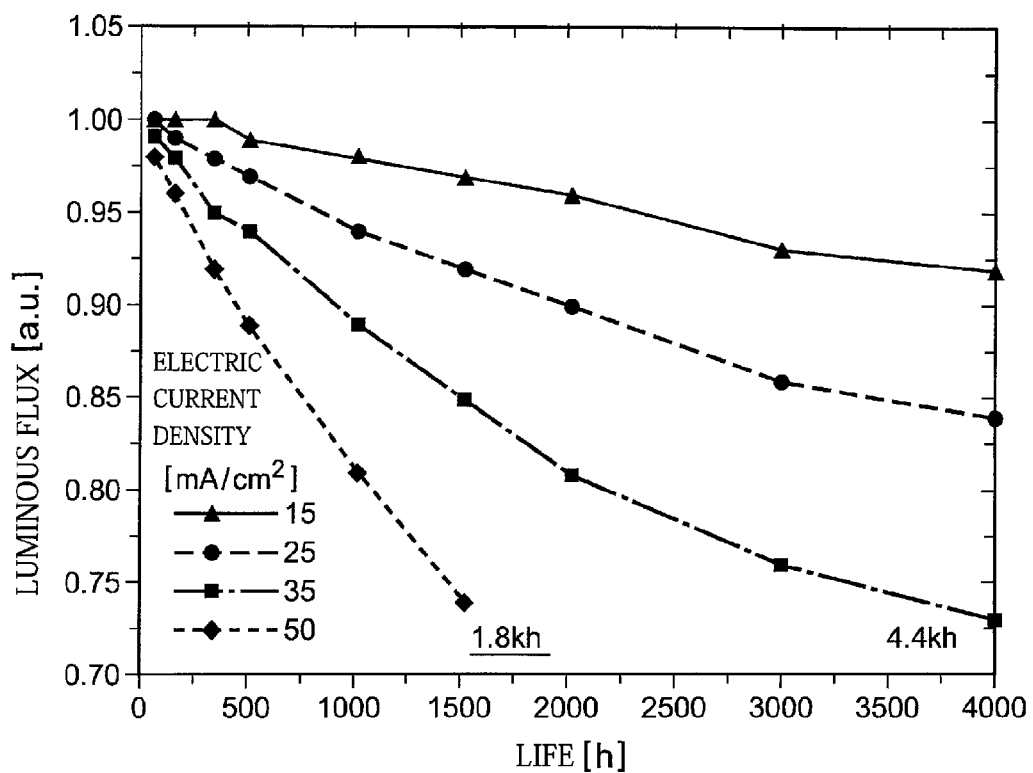
FIG. 16 is a graph showing a relationship between luminous flux and life by electric current density in an organic EL light emitting layer.

In general, in organic EL, electric current density is proportional to luminance. Consequently, the electric current density should be increased in order to emit light with high luminance intensity. However, the temperature of the light emitting layer is increased as the electric current density is increased, reducing the life of the light emitting layer. FIG. 16 is a graph showing a relationship between luminous flux and life by electric current density in an organic EL light emitting layer. As is seen from the graph, when the electric current density is increased, a time during which a predetermined luminous flux can be held (a luminous flux holding factor) is reduced.

Figure 17:
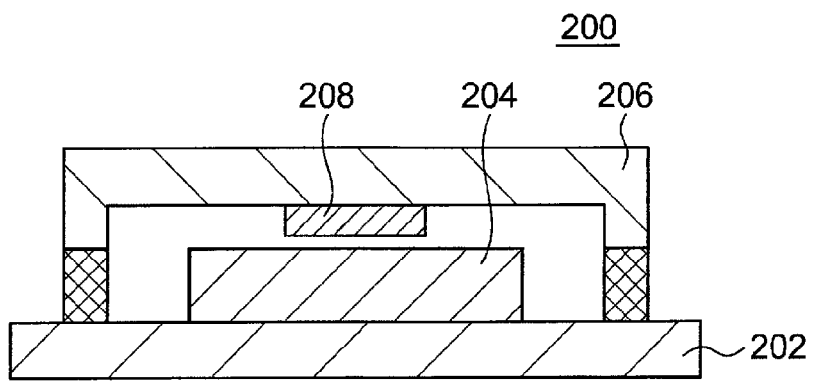
FIG. 17 shows an example of a configuration of a general organic EL panel.

FIG. 17 shows an example of a configuration of a general organic EL panel 200. Normally, heat generated in a light emitting layer 204 of the organic EL panel is dissipated through a glass substrate 202 or is dissipated into a cavity glass 206 by virtue of a convection of nitrogen gas sealed therein. The heat conductivities of glass and nitrogen are both low and are hence not necessarily suitable for a material that dissipates heat generated in a light emitting layer. In FIG. 17, a reference number 208 indicates a moisture absorbent.

The inventors of this patent application have considered that an organic EL panel that can emit light with high luminance intensity can be realized by suppressing the increase in temperature of an organic EL light emitting layer through the usage of a highly heat conductive material for a constituent member of an organic EL panel. Hereinafter, the construction of such an organic EL panel will be described.

Figure 18:
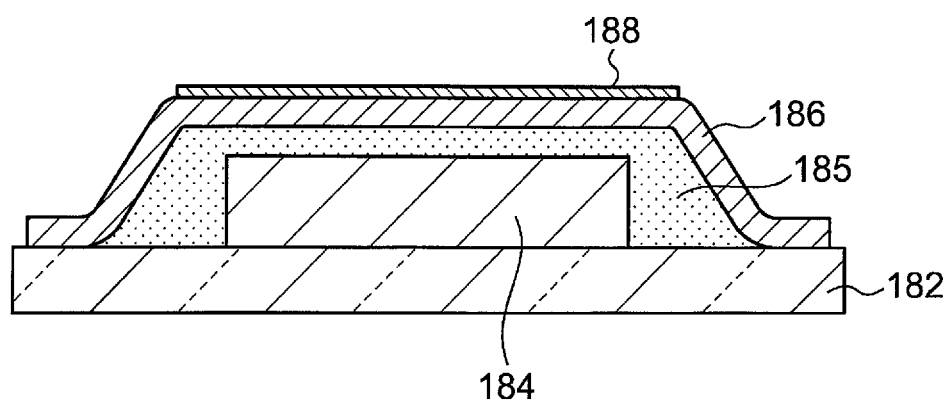
FIG. 18 is a sectional view showing a schematic configuration of a high-luminance organic EL panel according to an embodiment of the invention.

FIG. 18 is a sectional view showing a schematic configuration of a light emitting portion of a high-luminance organic EL panel 180. In the organic EL panel 180, as a substrate, a light transmitting alumina substrate 182 is used in place of a glass substrate. A light emitting layer 184 is formed on the light transmitting alumina substrate 182 through deposition. The light emitting layer 184 is sealed with a transparent film 186 with a moisture resistant coating in place of the related-art glass substrate or cavity glass. A sealing material 185 containing a moisture absorbing agent such as a gel is sealed in an interior space defined by the transparent film 186 in place of the related-art nitrogen gas. Further, a metallic film 188 such as an aluminum foil is affixed to a side of the transparent film 186 which is opposite to a side facing the light emitting layer 184. The metallic film 188 may be formed and prepared through chemical vapor deposition (CVD).

The light transmitting alumina substrate 182 has a higher thermal conductivity than that of the related-art glass substrate. Additionally, the sealing material 185 has a higher thermal conductivity than that of nitrogen gas. Further, heat dissipation is promoted by the metallic film 188. In this way, the dissipation of heat generated in the light emitting layer 184 is promoted by the use of the materials having higher thermal conductivities as constituent elements, whereby the increase in temperature of the light emitting layer 184 is suppressed, thereby making it possible to realize a high-luminance organic EL panel.

In addition, since the refractive index of the light transmitting alumina substrate is higher than that of the glass substrate, the loss of light by the total reflection on an interface between the substrate and the light emitting layer can be reduced, thereby resulting in an advantage that the light emitting efficiency is improved.

It is noted that the organic EL panel shown in FIG. 18 can be combined with all the embodiments that have been described herein for use.

In the embodiments that have been described herein, the space or spaces defined between the organic EL panel and the half mirror, the mirror, the outer lens or the convex mirror that is disposed at the front or rear of the organic EL panel may be filled with a transparent resin. In general, a difference in refractive index between transparent resin and glass is smaller than a difference in refractive index between air and glass. Because of this, when the spaces are filled with the transparent resin, a refraction angle at an interface between the glass substrate and the transparent resin becomes small, and therefore, the light or luminous intensity distribution accuracy can be improved, thereby making it possible to enhance the utilization efficiency of light.

In the embodiments shown in FIGS. 2A, 2B and FIGS. 5A, 5B, the mirror surface is described as being formed on the front surface of the organic EL panel. In place of this technique, a configuration may be adopted in which an electrode of the organic EL light emitting portion is made up of an aluminum electrode and this electrode is made use of as a mirror surface. By adopting this configuration, the metal deposition process can be omitted so as to suppress the increase in cost.

While the half mirror is used in the embodiments that have been described herein, the half mirror so used is not limited to one in which the intensity of incident light is almost the same as the intensity of transmitted light, that is, whose transmissivity is around 50%. Thus, the transmissivity may be increased or decreased as required.

In part of the embodiments that have been described herein, the annular light emitting portion is described as being provided on the organic EL panel. However, a light emitting portion of a different shape may be adopted. For example, a linear or U-shaped light emitting portion may be formed.

In the embodiments that have been described herein, the organic EL panel is described as being flat as a whole. However, the organic EL panel itself may be bent curvilinearly or refractive by using an extremely thin glass or transparent resin that can be bent curvilinearly in place of the glass substrate.

What is claimed is:

1. A vehicular lamp comprising:
    a planar light emitting member having one or more organic EL light emitting portions at part of an organic EL panel; and
    a reflecting member and a partially-transparent mirror that are disposed so as to face each other so that light emitted from the one or more organic EL light emitting portions is reflected repeatedly while allowing part of the light to be transmitted to the front,
    wherein the partially-transparent mirror is disposed at the front of the planar light emitting member,
    wherein the partially-transparent mirror has such a size that whole or at least part of each of the one or more organic EL light emitting portions does not overlap with any of the partially-transparent mirror when the vehicular lamp is observed from a front thereof,
    wherein the reflecting member is a cathode layer that is situated at a portion of the planar light emitting member other than the one or more organic EL light emitting portions, and
    wherein the cathode layer of the organic EL panel is a mirror surface.

2. A vehicular lamp comprising:
a planar light emitting member having an organic EL light emitting portion only at part of a layer in a substrate; and
a reflecting member and a partially-transparent mirror that are disposed so as to face each other so that light emitted from the organic EL light emitting portion is reflected repeatedly while allowing part of the light to be transmitted to the front,
wherein a portion of the layer in the substrate other than the organic EL light emitting portion is transparent,
wherein the portion of the layer in the substrate other than the organic EL light emitting portion is a structure of the planar light emitting member,
wherein the reflecting member is a mirror that is disposed at the rear of the planar light emitting member as a separate member from the planar light emitting member, and
wherein the organic EL light emitting portion emits the light from its front and rear surfaces.

3. The vehicular lamp according to claim 2, wherein the partially-transparent mirror is disposed at the front of the planar light emitting member.

4. The vehicular lamp according to claim 2, wherein the partially-transparent mirror is formed on a rear surface of the planar light emitting member.

5. The vehicular lamp according to claim 2, wherein the mirror has a curved surface.

6. The vehicular lamp according to claim 2, comprising further:
a second planar light emitting member having an organic EL light emitting portion and disposed at the front of the partially-transparent mirror.

7. The vehicular lamp according to claim 1, wherein the substrate is a light transmitting alumina substrate.

8. The vehicular lamp according to claim 2, wherein the portion of the planar light emitting member is in a same layer as the organic EL light emitting portion.

9. A vehicular lamp comprising:
a planar light emitting member having an organic EL light emitting portion at part of a substrate; and
a reflecting member and a partially-transparent mirror that are disposed so as to face each other so that light emitted from the organic EL light emitting portion is reflected repeatedly while allowing part of the light to be transmitted to the front,
wherein a central portion of the planar light emitting member at a portion of the substrate not overlapping in plan view with the organic EL light emitting portion is transparent and encircled by the organic EL light emitting portion, and
wherein at least part of the light is reflected by the reflecting member and passes through the central portion.

\* \* \* \* \*